US005497209A

United States Patent [19]
Iwane

[11] Patent Number: 5,497,209
[45] Date of Patent: Mar. 5, 1996

[54] AUTOMATIC FOCUSING DEVICE AND AUTOMATIC FOCUSING METHOD

[75] Inventor: Toru Iwane, Yokohama, Japan

[73] Assignee: Nikon Corporation, Tokyo, Japan

[21] Appl. No.: 364,233

[22] Filed: Dec. 27, 1994

[30] Foreign Application Priority Data

Dec. 28, 1993 [JP] Japan .................................. 5-337212

[51] Int. Cl.$^6$ .................................................. G03B 13/36
[52] U.S. Cl. ........................................................ 354/402
[58] Field of Search ..................................... 354/400, 402

[56] References Cited

U.S. PATENT DOCUMENTS

4,841,325  6/1989  Hoshino et al. ......................... 354/402

Primary Examiner—W. B. Perkey
Attorney, Agent, or Firm—Oliff & Berridge

[57] ABSTRACT

To improve focusing precision and responsiveness in an automatic focusing device, an accurate lens driving amount is found in a short time from a detected defocus amount. A conversion coefficient γs is calculated by successively correcting a correction coefficient Lm using the next correction coefficient L(m+1) and the defocus amount ΔBf and by correcting the specific conversion coefficient γ using these correction coefficients and the defocus amount ΔBf. Driving of the focusing lens is controlled by calculating a driving amount Δx for the focusing lens from the defocus amount ΔBf using the conversion coefficient γs.

18 Claims, 5 Drawing Sheets

|  | CLOSEST POINT TO INFINITY | INFINITY TO CLOSEST POINT |
|---|---|---|
| ACTUAL DEFOCUS AMOUNT | −5.86 mm | 14.76 mm |
| LENS DRIVING AMT. BY CONVENTIONAL LINEAR APPROX. OF CONVERSION COEFF. ℵS | −4.35 mm | 9.51 mm |
| LENS DRIVING AMT. BY CONV. COEFF. ℵS FROM FORMULAS 1 AND 2 | −5.32 mm | 14.68 mm |

FIG.5

AUTOMATIC FOCUSING DEVICE AND AUTOMATIC FOCUSING METHOD

BACKGROUND OF THE INVENTION

1. Field of the Invention

The present invention relates to an automatic focusing device and an automatic focusing method for use in a camera or an imaging device capable of performing focus adjustment of the photographic lens. Focusing adjustment is accomplished by determining the defocus amount of the photographic lens from the light from the subject coming through the photographic lens.

2. Description of Related Art

An automatic focusing device is known for imaging devices such as cameras and video cameras in which focus adjustment of the photographic lens is performed by determining the amount of deviation (defocus amount) of the photographic lens from the light from the subject coming through the photographic lens. For instance, refer to Japanese unexamined patent publication Hei 2-34003.

With this type of automatic focusing device, the light from the subject coming through the photographic lens is introduced to an image sensor through a focus detection optical system. A pair of subject images are formed on the image sensor and converted into a pair of subject image data according to the light intensity distribution. On the basis of the pair of subject image data, the amount of defocus is detected. The amount of defocus comprises the difference between the image-forming plane of the subject image for the photographic lens and a predetermined focal plane that coincides with the film plane. The defocus amount is converted into the driving amount for the focusing lens included in the photographic lens through a predetermined conversion coefficient and a correction coefficient. Focusing is accomplished by driving the focusing lens according to the driving amount.

However, because there is a non-linear relationship between the defocus amount of the photographic lens and the driving amount of the focusing lens, it is troublesome to accurately convert the defocus amount into the actual driving amount of the focusing lens using a single conversion coefficient.

In particular, in recent times, as photographic lenses have become more compact, lighter weight and with higher variable magnification, the non-linearity of the relationship between the defocus amount and the driving amount of the focusing lens has increased. In addition to the quantitative increase in non-linearity, the factors involved in the conversion coefficient have also become more troublesome.

In actuality, with some types of photographic lenses, the ratio between the maximum and minimum values of the conversion coefficient over the entire focusing region can vary by more than a factor of three. This kind of large variance in the conversion coefficient includes many non-linear factors, making it impossible to accurately calculate the lens driving amount by merely correcting the conversion coefficient to be linear, as has conventionally been done.

In addition, conventional telephoto lenses have had essentially no variance in the conversion coefficient and have had highly linear properties. However, this linearity has been lost due to the recent trend toward zoom features. This kind of trend in telephoto lenses has had a large effect on automatic focusing devices. In other words, telephoto lenses have come to have a large amount of focus driving, causing the defocus amount to increase. In addition, they are frequently used in applications such as tracking a moving subject, so that a sophisticated automatic focusing function is required. When the lens focus driving amount is great, error in the driving amount of the focusing lens causes the generation of a large out-of-focus effect. Consequently, even from the perspective of the anticipated focusing function, it is necessary to reduce errors in the driving amount as much as possible.

When this kind of recent compact, light weight and high variable magnification photographic lens is driven by a conventional automatic focusing device, time is required for the focusing to take place. Further, the focusing lens may move beyond the focusing point or stop before reaching the focusing point. All of these problems result in an out-of-focus photograph. In addition, with respect to moving subjects, the focusing lens does not converge to the focusing position, causing the occurrence of the "hunching" phenomenon.

In order to solve these kinds of problems, consideration was given to improving the method of correcting the conversion coefficient used to convert the defocus amount into a lens driving amount. Simply making the correction term a higher order term until the conversion error between the defocus amount and the lens driving amount is sufficiently small can also be considered. However, in order to do so, it is necessary to store large quantities of conversion coefficient correction data in the photographic lens corresponding to the magnification rate and focusing lens position. In addition, a large time interval is required for communicating and processing the data when conversion is made from the defocus amount to the lens driving amount, causing the focus adjustment responsiveness and convergence of the focusing lens to worsen.

SUMMARY OF THE INVENTION

An object of the embodiments of the present invention is to improve the responsiveness and focusing precision of an automatic focusing device by finding an accurate lens driving amount in a short time from the detected defocus amount.

The automatic focusing device according to a preferred embodiment of the invention comprises a focus detection means for detecting the defocus amount $\Delta Bf$ of the image-forming plane from a predetermined focal plane of a lens system. A memory means, with a specific conversion coefficient $\gamma$, is used to convert the defocus amount $\Delta Bf$ into a driving amount $\Delta x$ of the focusing lens of the photographic lens system. A plurality of correction coefficients Lm (m=1, 2, . . . ) are used to correct the conversion coefficient $\gamma$ according to the defocus amount $\Delta Bf$. A conversion coefficient calculation means calculates a conversion coefficient $\gamma s$ on the basis of the specific conversion coefficient $\gamma$ stored in the memory means and the plurality of values of the correction coefficients Lm (m=1, 2, . . . ) stored in the memory means. A lens driving amount calculation means calculates the driving amount $\Delta x$ of the focusing lens from the defocus amount $\Delta Bf$ calculated by the focus detection means, using the conversion coefficient $\gamma s$ calculated by the conversion coefficient calculation means. A lens driving means controls driving of the focusing lens based on the driving amount $\Delta x$ calculated by the lens driving amount calculation means. The conversion coefficient calculation means calculates the conversion coefficient $\gamma s$ by successively correcting correction coefficients Lm using the next correction coefficient L(m+1) and the defocus amount $\Delta Bf$ and correcting the specific correction coefficient $\gamma$ using these correction coefficients and the defocus amount $\Delta Bf$ thereby achieving the above objective.

In the automatic focusing device according to this invention, the conversion coefficient calculation means calculates the conversion coefficient $\gamma s$ according to $$\gamma s = \gamma(1 - \Delta Bf) \over {L1(1 - \Delta Bf) \over {L2(1 - \Delta Bf) \over L3 \ldots}}} \qquad \text{(Formula 1)}$$

The lens driving amount calculation means calculates the driving amount $\Delta x$ according to $$\Delta x = \Delta Bf/\gamma s. \qquad \text{(Formula 2)}$$

The automatic focusing device of this invention also comprises a position detection means for detecting the position of the focusing lens of the photographic lens system. The memory means stores a specific conversion coefficient $\gamma(i)$ (i=1,2, ... ,n) for each of the regions i, when the lens driving range of the focusing lens is divided into n regions. A plurality of correction coefficients Lm(i) (i=1, 2, ... ,n; m=1, 2, ... ) are also stored for each of the regions. The coefficient calculation means calculates a conversion coefficient $\gamma s$ on the basis of the specific conversion coefficient $\gamma(i)$ and the plurality of values of the correction coefficients Lm(i) (i=1,2, ... ,n; m=1,2, ... ) for each region that corresponds to the position of the focusing lens detected by the position detection means using the specific conversion coefficient $\gamma(i)$ and the plurality of values of the correction coefficient Lm(i) for each driving region of the focusing lens stored in the memory means. Then, the conversion coefficient $\gamma s$ is calculated for each region according to $$\gamma s = \gamma(i)(1 - \Delta Bf) \over {L1(i)(1 - \Delta Bf) \over {L2(i)(1 - \Delta Bf) \over L3(i) \ldots}}} \qquad \text{(Formula 1)}$$

The automatic focusing device of this invention further comprises a focal distance detection means for detecting the focal distance of a variable magnification lens system. The memory means stores a specific conversion coefficient $\gamma(i)$ (i=1,2, ... ,n) for each of the regions i, when the focal distance range of the variable magnification lens system is divided into n regions. A plurality of correction coefficients Lm(i) (i=1,2, ... ,n; m=1, 2, ... ) for each of the regions, which are used to correct the conversion coefficient $\gamma(i)$ in accordance with the defocus amount $\Delta Bf$, are also stored. The conversion coefficient calculation means calculates a conversion coefficient $\gamma s$ based on the specific conversion coefficient $\gamma(i)$ and the plurality of values of the correction coefficients Lm(i) (i=1,2, ... ,n; m=1,2, ... ) for the regions corresponding to the focal distance detected by the focal distance detection means using the specific conversion coefficient $\gamma(i)$ and the plurality of values of the correction coefficient Lm(i) for each focal distance region of the variable magnification lens system stored in the memory means using Formula 1 as described above.

The invention also relates to an automatic focusing method wherein the conversion coefficient $\gamma s$ is calculated on the basis of a specific conversion coefficient $\gamma$ used to convert the defocus amount $\Delta Bf$ of the image-forming plane from a predetermined focal plane of the lens system to the amount $\Delta x$ of driving the focusing lens. The plurality of values of the correction coefficient Lm (m=1,2, ... ) are used to correct the conversion coefficient $\gamma$ according to the defocus amount $\Delta Bf$, and driving of the focusing lens is controlled by calculating the driving amount $\Delta x$ of the focusing lens from the defocus amount $\Delta Bf$ using the calculated conversion coefficient $\gamma s$. Calculation of the conversion coefficient $\gamma s$ is accomplished by successively correcting the correction coefficients Lm using the next correction coefficient L(m+1) and the defocus amount $\Delta Bf$ and by correcting the specific correction coefficient $\gamma$ using these correction coefficients and the defocus amount $\Delta Bf$, thereby achieving the above objective.

According to this method, the conversion coefficient $\gamma s$ is calculated according to $$\gamma s = \gamma(1 - \Delta Bf) \over {L1(1 - \Delta Bf) \over {L2(1 - \Delta Bf) \over L3 \ldots}}} \qquad \text{(Formula 1)}$$

and the driving amount $\Delta x$ is calculated according to $$\Delta x = \Delta Bf/\gamma s. \qquad \text{(Formula 2)}$$

The automatic focusing method of this invention also divides the driving range of the focusing lens of the photographic lens system into n regions and detects the position of the focusing lens. The conversion coefficient $\gamma s$ is calculated on the basis of a specific conversion coefficient $\gamma(i)$ (i=1,2, ... ,n) for each region i corresponding to the position of the focusing lens, which is used to convert the defocus amount $\Delta Bf$ of the image-forming plane from a predetermined focal plane of the photographic lens system to the driving amount $\Delta x$ of the focusing lens. The plurality of values of the correction coefficient Lm(i) (i=1,2, ... ,n; m=1,2, ... ) for each region corresponding to the position of the focusing lens are used to correct the conversion coefficient $\gamma(i)$ according to the defocus amount $\Delta Bf$. Driving of the focusing lens is controlled by calculating the driving amount $\Delta x$ of the focusing lens from the defocus amount $\Delta Bf$ using the calculated conversion coefficient $\gamma s$.

The automatic focusing method also divides the focal distance range of a variable magnification lens system into n regions and detects the focal distance of a variable magnification lens system. The conversion coefficient $\gamma s$ is calculated on the basis of a specific conversion coefficient $\gamma(i)$ (i=1,2, ... ,n) for each region i corresponding to the focal distance of the variable magnification lens system.

Taking $\Delta Bf$ to be the defocus amount of either the photographic lens system or the variable magnification lens system detected by the focus detection means, the driving amount $\Delta x$ of the focusing lens used to effect focusing in either the photographic lens system or the variable magnification lens system can be found using Formula 2 described above.

The relationship between the lens driving amount $\Delta x$ and the defocus amount $\Delta Bf$ of the photographic lens system or the variable magnification lens system can be considered to be not merely non-linear, but to have specific characteristics. In other words, it is possible to think of the relationship as encompassing fundamental factors and characteristics that are not linear, and combining these factors and characteristics yields the non-linearity. It is also possible to think of recent photographic lens systems and variable magnification lens systems that are highly nonlinear as having a larger number of coefficients of higher order factors than do conventional lenses. Here, by creating a telescoping structure by applying the correction coefficient to the conversion coefficient $\gamma s$ in the formula relating the defocus amount $\Delta Bf$ and the driving amount Δx of the focusing lens, a formula relating the two can be obtained that is close to the actual relationship and exhibits the small errors shown in Formula 1.

Here, the relationship formulae of a conventional automatic focusing device would be similar to the following examples.

$$\Delta x = \frac{\Delta Bf}{\gamma\left(1 - \frac{\Delta Bf}{L}\right)} \quad \text{(Formula 3)}$$

$$\gamma s = \gamma\left(1 - \frac{\Delta Bf}{L}\right) \quad \text{(Formula 4)}$$

These formulae serve to correct the specific conversion coefficient γ using a single correction coefficient L and are dependent on the defocus amount ΔBf, while Formula 1 uses a plurality of correction coefficients L1, L2, L3, etc., and is in the form of a continued fraction. In other words, because Formulas 1 is not rooted in the specific properties of the lens, it is more in line with the actual condition of the lens driving and image plane driving than is the Taylor expansion Formula 4, thereby reducing errors in computing the lens driving amount and improving the precision of focusing.

BRIEF DESCRIPTION OF THE DRAWINGS

The invention is described in conjunction with the following drawings in which like reference numerals designate like elements and wherein.

DETAILED DESCRIPTION OF PREFERRED EMBODIMENTS

Figure 1:
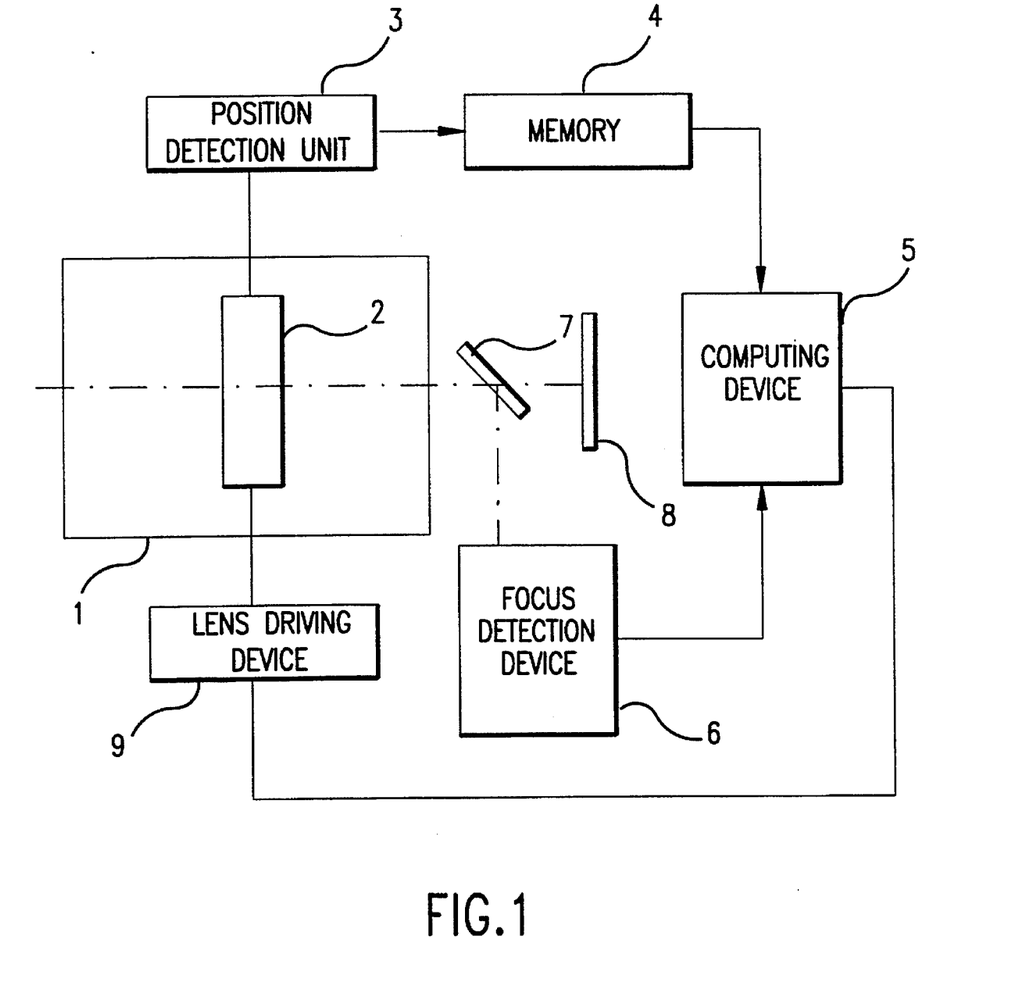
FIG. 1 is a function block drawing showing the construction of an embodiment of the present invention.

FIG. 1 is a block diagram showing the construction of an embodiment of an automatic focusing device according to the present invention, applied to a camera. A diagram of an actual embodiment of the present invention is used in explaining the construction of the present invention in order to make it easier to understand, but the present invention is in no way limited to this embodiment.

As seen in FIG. 1, the automatic focusing device comprises a photographic lens 1 with a focusing lens 2. A position detection unit 3 and a correction value memory device 4 are provided for the photographic lens 1. Position detection unit 3 includes an encoder with separated electrodes, which detects the position of focusing lens 2. It would also be appropriate for position detection unit 3 to include an optical encoder or a potentiometer that can detect the position of focusing lens 2 continuously. Correction value memory device 4 divides the driving range of focusing lens 2 into n regions and stores a specific conversion coefficient γ(i) (i=1,2, . . . ,n) for each of the driving regions i (i=1,2, . . . ,n) used to convert the defocus amount ΔBf to the driving amount Δx of focusing lens 2. Correction coefficients L1(i) (i=1,2, . . . ,n) and L2(i) (i=1,2, . . . ,n) are stored as a table. The data in the driving regions that correspond to the position of focusing lens 2 obtained from position detection unit 3 are read and output to a computing device 5. When the position of focusing lens 2 is detected with more precision than the number n of regions in the correction value table or when it is detected continuously, a complete computation is performed using the data from the correction value table. Thus, accurate data corresponding to the position of focusing lens 2 is calculated.

A focus detection device 6 introduces light passing through photographic lens 1 to an image sensor, not shown in the drawing, via a focus detection optical system. This causes the formation of a pair of subject images on the image sensor and converts them into a pair of subject image signals corresponding to the distribution of the light intensity. Based on the pair of subject image signals, the defocus amount ΔBf is calculated. The defocus amount comprises the deviation of the plane on which the subject images are formed by photographic lens 1 from a predetermined focal plane which coincides with the plane of photographic film 8. Computing device 5 calculates the conversion coefficient γs based on the specific conversion coefficient γ(i) and correction coefficients L1(i) and L2(i) corresponding to the region i (i=1,2, . . . ,n) of the initial position of focusing lens 2 and converts the defocus amount ΔBf into a driving amount Δx for focusing lens 2 based on the conversion coefficient γs. A lens driving device 9 drives focusing lens 2 according to the driving amount Δx calculated by computing device 5.

Computing device 5 calculates the driving amount Δx in accordance with the following formulae:

$$\gamma s = \gamma(1 - \frac{\Delta Bf}{L1(1 - \frac{\Delta Bf}{L2(1 - \Delta Bf)})}) \quad \text{(Formula 1)}$$

$$\Delta x = \Delta Bf/\gamma s \quad \text{(Formula 2)}$$

Figure 2:
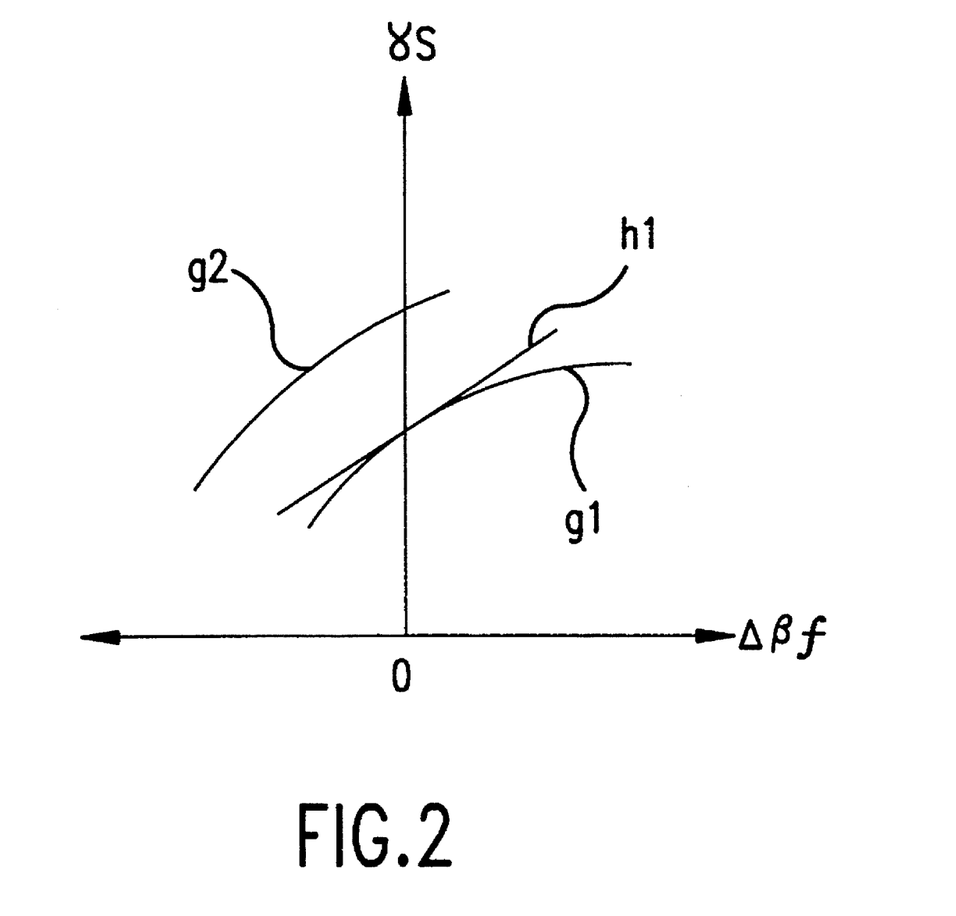
FIG. 2 is a graph showing the relationship between the defocus amount ΔBf and the conversion coefficient γs in a simple focus lens.

The relationship between a conversion coefficient γs and a defocus amount ΔBf based on the lens position of a simple focus lens is shown in FIG. 2. In FIG. 2, a curve g1 represents the change in the conversion coefficient γs when the initial position of the focusing lens is moved from the position focusing on the infinity point to a position focusing on the closest point. The curve g2 represents the change in the conversion coefficient γs when the initial position is moved from the position focusing on the closest point to the position focusing on the infinity point.

Figure 3:
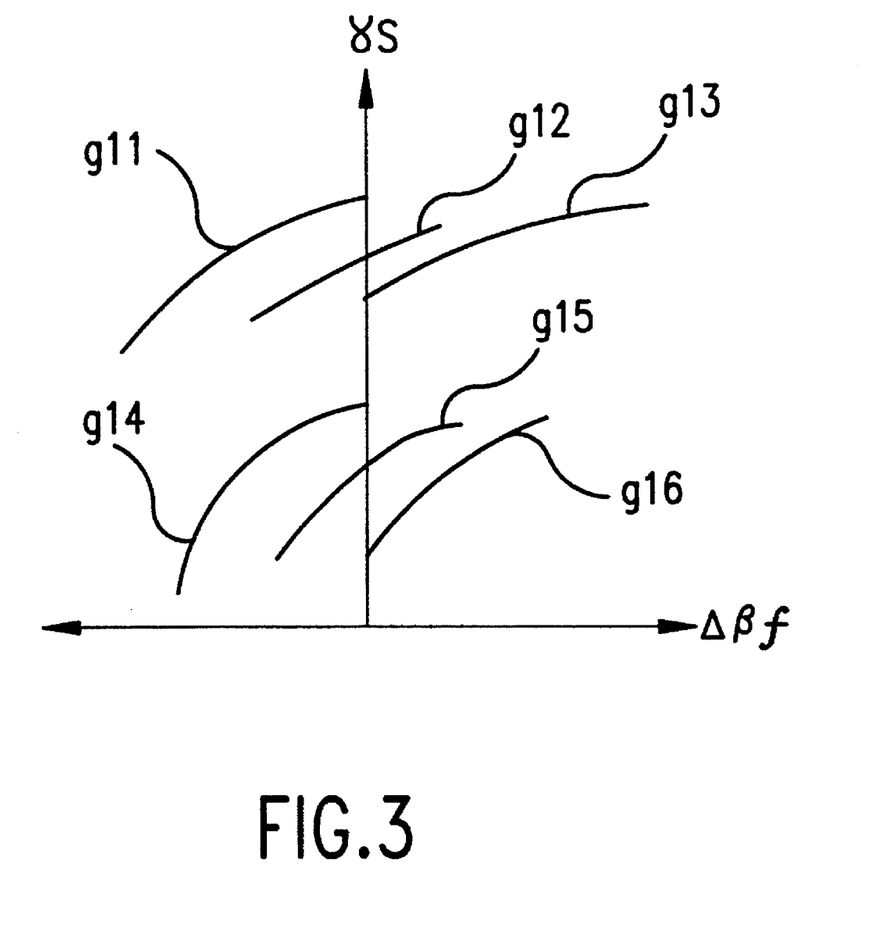
FIG. 3 is a graph showing the relationship between the defocus amount ΔBf and the conversion coefficient γs in a zoom lens.

FIG. 3 shows the relationship between the conversion coefficient γs and the defocus amount ΔBf at two focal distances for a zoom lens. In FIG. 3, curves g11, g12 and g13 represent the relationship at the first zoom position, while curves g14, g15 and g16 represent the relationship at the second zoom position. In addition, curves g11 and g14 show the change in the conversion coefficient γs in moving the focus from the closest point to the infinity point. Conversely, curves g13 and g16 show the relationship change in the conversion coefficient γs in moving from an initial focus at an infinity point to focus at the closest point. Curves g12 and g15 are between curves g11 and g13 and g14 and g16, respectively, and show the change in the conversion coefficient γs when the initial position is between focus at the infinity point and focus at the closest point and is moved from the infinity point toward the closest point.

All of these curves for the conversion coefficient γs are inclined with a gradual curve shape.

On the other hand, the conversion coefficient γs indicated by Formula 4 in a conventional automatic focusing device is comprised of the straight line indicated by h1 in FIG. 2. So, when the curvature of the conversion coefficient is great, it becomes necessary to conduct a correction ignoring the error either at the ends or in the center. The center is important to maintain a high convergence rate in automatic focusing because it includes the focusing position. Therefore, in actuality, it is necessary to conduct a correction ignoring the two ends. However, because the lens driving amount Δx given by Formula 2 is an equation in which the defocus amount ΔBf is divided by the conversion coefficient γs, the absolute value of the error in the lens driving amount becomes very great when the error at both ends, i.e. the defocus amount ΔBf, is large. For example, taking the defocus amount ΔBf to be 10 mm, a 30% error becomes 3 mm in the conversion of the defocus amount ΔBf. Accordingly, to solve this type of problem, it is necessary to make the curvature of the conversion coefficient γs curvilinear and to make corrections by following either curve g1 or g2.

The following Formula 5, which resembles a Taylor expansion used to correct the specific conversion coefficient γ(i), can be used as the correction formula.

$$\gamma s = \gamma(i)\left(1 - \frac{\Delta Bf}{L1(i)} - \frac{\Delta Bf^2}{L2(i)}\right) \quad \text{(Formula 5)}$$

Figure 4:
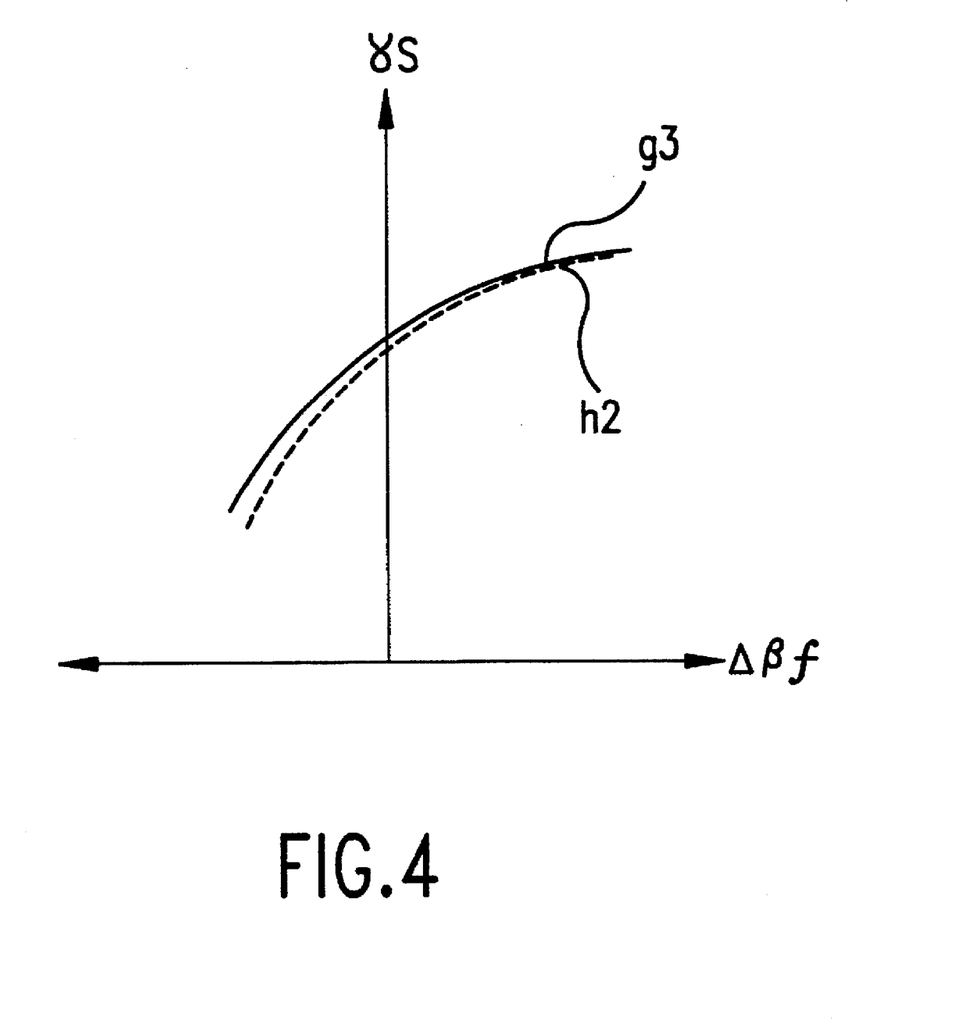
FIG. 4 is a graph used to explain the problems encountered when the conversion coefficient γs is approximated using a parabolic approximation.

The correction Formula 5 for the specific conversion coefficient γ(i) considerably improves the defects of the linear approximation given by Formula 4. However, since the Formula 5 is an approximation using a parabola, and because of the properties of parabolas, the curvature of the approximating curve differs greatly at the two ends thus making it impossible to simultaneously correct both the left end and the right end of inclined curves such as curve g1 and curve g2. In other words, as shown in FIG. 4, when the curve g3 of the conversion coefficient γs is approximated by parabola h2, if one end is made to match, the other differs by a large amount. Consequently, an adequate effect cannot be obtained even using higher order corrections.

Therefore, the specific conversion coefficient γ(i) is corrected in accordance with Formula 1. Formula 1 is a hyperbolic function, as is clear from the form of the function. With a hyperbola, the difference in curvature between the left and right ends is smaller than with a parabola, making it possible to very closely approximate the curves g1 and g2 of a conversion coefficient γs, which is inclined and slightly curved.

Figure 5:
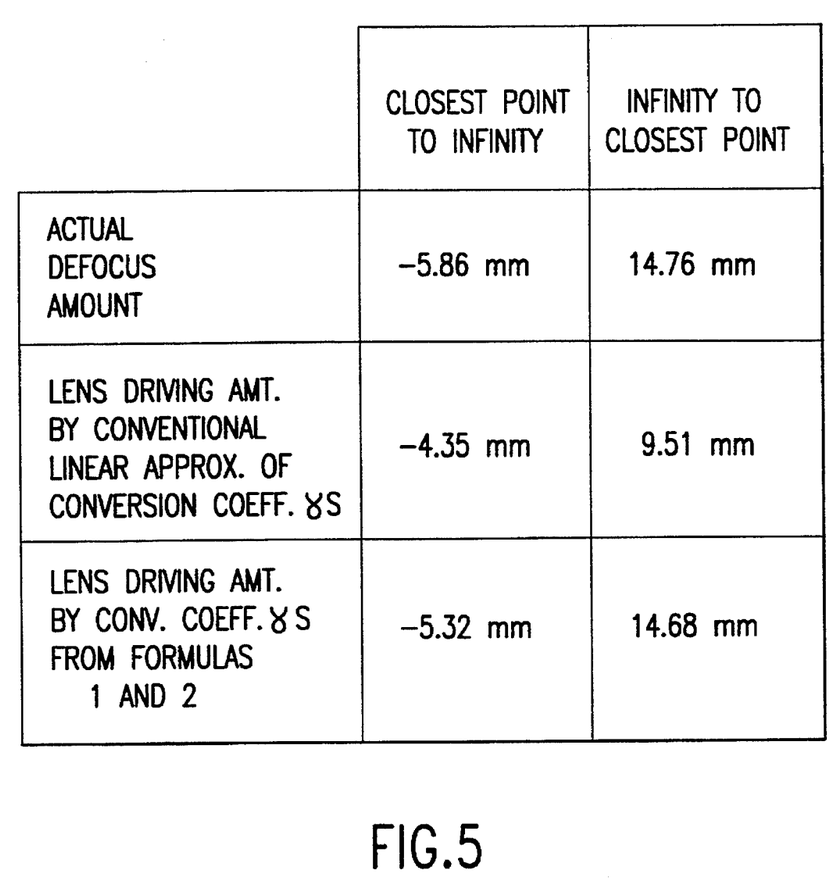
FIG. 5 is a table comparing the lens driving amount Δx found using a conventional linear approximation of the conversion coefficient γs and the lens driving amount Δx found using the conversion coefficient according to the present invention.

FIG. 5 is a table showing actual defocus amounts ΔBf and a comparison between the lens driving amount Δx found using a conventional linear approximation of the conversion coefficient γs and the lens driving amount Δx calculated from the conversion coefficient γs of Formula 1. As is clear from the table, there is only a small error between the lens driving amount Δx calculated from the conversion coefficient γs of Formula 1 and the actual defocus amount ΔBf, so that an accurate lens driving amount Δx is calculated.

With the above embodiment, the driving range of the focusing lens was divided into n regions, but the present invention can also be applied to cases wherein the driving range of the focusing lens is not divided into regions.

In addition, with the above embodiment, the specific conversion coefficient γ(i) was corrected by second degree terms using the two correction coefficients L1(i) and L2(i), but for cases where correction is accomplished to third degree terms, the conversion coefficient γs can be calculated according to the following formula:

$$\gamma s = \gamma(1 - \frac{\Delta Bf}{L1(1 - \frac{\Delta Bf}{L2(1 - \frac{\Delta Bf}{L3(1 - \Delta Bf)})})}) \quad \text{(Formula 1)}$$

When correction is made to higher degree terms, the correction coefficient γs can still be calculated using Formula 1 above modified to include additional correction coefficients.

The above embodiment relates to a simple focus photographic lens, but the present invention can also be applied to zoom lenses. In this case, the focal distance range of the zoom lens is divided into n regions. The conversion coefficient γs can be calculated according to Formula 1 above based on the specific conversion coefficient γ(i) in each focal distance region and the plurality of correction coefficients Lm(i) (i=1,2, ... ,n; m=1,2, ... ) in each focal distance region, which are used to correct the conversion coefficient γ(i) in accordance with the defocus amount ΔBf.

With the described invention, the conversion coefficient γs is calculated by successively correcting correction coefficients Lm using the next correction coefficient L(m+1) and the defocus amount ΔBf and correcting the specific correction coefficient γ using these correction coefficients and the defocus amount ΔBf. Driving of the focusing lens is controlled by calculating the driving amount Δx of the focusing lens from the defocus amount ΔBf using the conversion coefficient γs. Therefore, an accurate driving amount Δx can be calculated from the defocus amount ΔBf in a short period of time, thereby improving focusing precision and responsiveness.

Furthermore, the driving range of the focusing lens in the photographic lens system is divided into n regions and the position of the focusing lens is detected. The conversion coefficient γs is calculated by successively correcting correction coefficients Lm(i) (i=1,2, ... n; m=1,2, ... ) in the driving regions corresponding to the focusing lens position using the next correction coefficient L(m+1)(i) and the defocus amount ΔBf and correcting the specific conversion coefficient γ(i) of the driving regions corresponding to the focusing lens position using these correction coefficients and the defocus amount ΔBf.

Furthermore, the focal distance range of the variable magnification lens system is divided into n regions and the focal distance of the variable magnification lens system is detected. The conversion coefficient γs is calculated by successively correcting correction coefficients Lm(i) (i=1,2, ... n; m=1,2, ... ) in the regions corresponding to the focal distance of the variable magnification lens system using the next correction coefficient L(m+1)(i) and the defocus amount ΔBf and correcting the specific conversion coefficient γ(i) of the regions corresponding to the focal distance of the variable magnification lens system using these correction coefficients and the defocus amount ΔBf.

While this invention has been described in conjunction with specific embodiments thereof, it is evident that many alternatives, modifications and variations will be apparent to those skilled in the art. Accordingly, the preferred embodiments of the invention as set forth herein are intended to be illustrative, not limiting. Various changes may be made without departing from the spirit and scope of the invention as defined in the following claims.

What is claimed is:

1. An automatic focusing device for a focusing lens in a lens system having a predetermined focal plane and an image forming plane, comprising:

a focus detection means for detecting a defocus amount $\Delta Bf$ of the image forming plane from the predetermined focal plane of the lens system;

a memory means for storing a specific conversion coefficient $\gamma$ for converting the defocus amount $\Delta Bf$ into a driving amount $\Delta x$ for the focusing lens, and for storing a plurality of correction coefficients Lm (m=1, 2, ... ) for correcting the specific conversion coefficient $\gamma$ according to the defocus amount $\Delta Bf$;

a conversion coefficient calculation means for calculating a conversion coefficient $\gamma s$ based on the specific conversion coefficient $\gamma$ stored in the memory means and the plurality of correction coefficients Lm (m=1,2, ... ) stored in the memory means, wherein the conversion coefficient calculation means calculates the conversion coefficient $\gamma s$ by successively correcting the correction coefficients Lm using a next correction coefficient L(m+1) and the defocus amount $\Delta Bf$ and corrects the specific correction coefficient $\gamma$ using the correction coefficients and the defocus amount $\Delta Bf$;

lens driving amount calculation means for calculating the driving amount $\Delta x$ of the focusing lens from the defocus amount $\Delta Bf$ calculated by the focus detection means using the conversion coefficient $\gamma s$ calculated by the conversion coefficient calculation means; and, a lens driving means for controlling driving of the focusing lens based on the driving amount $\Delta x$ calculated by the lens driving amount calculation means.

2. The automatic focusing device of claim 1, wherein the conversion coefficient calculation means calculates the conversion coefficient $\gamma s$ based on a relationship represented by:

$$\gamma s = \cfrac{\gamma(1 - \Delta Bf)}{\cfrac{L1(1 - \Delta Bf)}{\cfrac{L2(1 - \Delta Bf)}{L3 \ldots}}}$$

and the lens driving amount calculation means calculates the driving amount $\Delta x$ based on a relationship represented by:

$\Delta x = \Delta Bf/\gamma s$.

3. The automatic focusing device of claim 1 wherein the focus detection means detects a defocus amount $\Delta Bf$ of the image-forming plane from a predetermined focal plane of a photographic lens system with the focusing lens having a lens driving range, and further comprising a position detection means for detecting a position of the focusing lens in the photographic lens system, wherein the memory means stores a specific conversion coefficient $\gamma(i)$ (i=1,2, ... ,n) for each region i when the lens driving range of the focusing lens is divided into n regions for converting the defocus amount $\Delta Bf$ to a driving amount $\Delta x$ and stores a correction coefficient Lm(i) (i=1,2, ... ,n; m=1, 2, ... ) for each region i for correcting the conversion coefficient $\gamma(i)$ in accordance with the defocus amount $\Delta Bf$, wherein for each region i the conversion coefficient has one value and the correction coefficient has a plurality of values, and wherein the conversion coefficient calculation means calculates the conversion coefficient $\gamma s$ based on the specific conversion coefficient $\gamma(i)$ and the plurality of values of the correction coefficients Lm(i) (i=1,2, ... ,n; m=1,2, ... ) for the regions that correspond to the position of the focusing lens detected by the position detection means using the specific conversion coefficient $\gamma(i)$ and the plurality of correction coefficients Lm(i) for each region of the focusing lens stored in the memory means, and calculates the conversion coefficient $\gamma s$ by successively correcting correction coefficients Lm(i) using the next correction coefficient L(m+1)(i) and the defocus amount $\Delta Bf$, and corrects the specific conversion coefficient $\gamma(i)$ using these correction coefficients and the defocus amount $\Delta Bf$.

4. The automatic focusing device of claim 3, wherein the conversion coefficient calculation means calculates the conversion coefficient $\gamma s$ based on a relationship represented by $$\gamma s = \cfrac{\gamma(i)(1 - \Delta Bf)}{\cfrac{L1(i)(1 - \Delta Bf)}{\cfrac{L2(i)(1 - \Delta Bf)}{L3(i) \ldots}}}$$

and the lens driving amount calculation means calculates the driving amount $\Delta x$ based on a relationship represented by $\Delta x = \Delta Bf/\gamma s$.

5. The automatic focusing device of claim 1 wherein the focus detection means detects the defocus amount $\Delta Bf$ of the image-forming plane from a predetermined focal plane of a variable magnification lens system having a focal distance range, and further comprising a focal distance detection means for detecting the focal distance of the variable magnification lens system, wherein the memory means stores a specific conversion coefficient $\gamma(i)$ (i=1,2, ... ,n) for each region i when the focal distance of the variable magnification lens system is divided into n regions for converting the defocus amount $\Delta Bf$ to a driving amount $\Delta x$ for the focusing lens of the variable magnification lens system and a plurality of correction coefficients Lm(i) (i=1,2, ... ,n; m=1, 2, ... ) for each region i for correcting the conversion coefficient $\gamma(i)$ in accordance with the defocus amount $\Delta Bf$, and wherein the conversion coefficient calculation means calculates the conversion coefficient $\gamma s$ based on the specific conversion coefficient $\gamma(i)$ and the plurality of values of the correction coefficients Lm(i) (i=1,2, ... ,n; m=1,2, ... ) for the regions corresponding to the focal distance detected by the focal distance detection means using the specific conversion coefficient $\gamma(i)$ and the plurality of values of the correction coefficient Lm(i) for each focal distance region of the variable magnification lens system stored in the memory means, wherein the conversion coefficient calculation means calculates the conversion coefficient $\gamma s$ by successively correcting the correction coefficients Lm(i) using the next correction coefficient L(m+1)(i) and the defocus amount $\Delta Bf$ and corrects the specific conversion coefficient $\gamma(i)$ using these correction coefficients and the defocus amount $\Delta Bf$.

6. The automatic focusing device of claim 5 wherein the conversion coefficient calculation means calculates the conversion coefficient $\gamma s$ based on a relationship represented by $$\gamma s = \cfrac{\gamma(i)(1 - \Delta Bf)}{\cfrac{L1(i)(1 - \Delta Bf)}{\cfrac{L2(i)(1 - \Delta Bf)}{L3(i) \ldots}}}$$

and the lens driving amount calculation means calculates the driving amount $\Delta x$ based on a relationship represented by $\Delta x = \Delta Bf/\gamma s$.

7. An automatic focusing device for a lens system having a focusing lens comprising:
   a focus detection device that detects a defocus amount $\Delta Bf$ by determining a deviation amount of the focusing lens from light from a subject passing through the focusing lens;
   a memory that stores a specific conversion coefficient $\gamma$ and a plurality of correction coefficients Lm (m=1, 2, ...);
   a conversion coefficient corrector that determines a conversion coefficient $\gamma s$ by successively correcting a stored correction coefficient Lm using a successive correction coefficient L(m+1) and the defocus amount $\Delta Bf$ and correcting the stored specific conversion coefficient $\gamma$ using the corrected correction coefficient Lm and the defocus amount $\Delta Bf$;
   a driving amount determiner that determines a driving amount $\Delta x$ for the focusing lens based on the defocus amount $\Delta Bf$ and the conversion coefficient $\gamma s$; and
   a driving controller that drives the focusing lens by the driving amount $\Delta x$ to automatically focus the focusing lens.

8. The automatic focusing device of claim 7 wherein the conversion coefficient corrector corrects the conversion coefficient based on $$\gamma s = \gamma (1 - \Delta Bf) \over {L1(1 - \Delta Bf) \over {L2(1 - \Delta Bf) \over L3 \ldots}}$$

and the driving amount determiner determines the lens driving amount $\Delta x$ based on $$\Delta x = \Delta Bf / \gamma s.$$

9. The automatic focusing device of claim 7 further comprising
   a position detector that detects a position of the focusing lens in the lens system,
   wherein the focusing lens has a driving range divided into n regions i and the memory stores a specific conversion coefficient $\gamma(i)$ (i=1, 2, ..., n) for each region i and stores a correction coefficient Lm(i) (i=1, 2, ..., n; m=1, 2, ...) for each region i, and the conversion coefficient corrector determines the conversion coefficient $\gamma s$ based on the specific conversion coefficient $\gamma(i)$ and the correction coefficients Lm (i) for the regions that correspond to the detected position of the focusing lens.

10. The automatic focusing device of claim 9 wherein the conversion coefficient corrector corrects the conversion coefficient based on $$\gamma s = \gamma(i)(1 - \Delta Bf) \over {L1(i)(1 - \Delta Bf) \over {L2(i)(1 - \Delta Bf) \over L3(i) \ldots}}$$

and the driving amount determiner determines the lens driving amount $\Delta x$ based on $$\Delta x = \Delta Bf / \gamma s.$$

11. The automatic focusing device of claim 7 wherein the lens system is a variable magnification lens system and further comprising
   a focal distance detector that detects a focal distance of the variable magnification lens system,
   wherein the focal distance is divided into n regions i and the memory stores a specific conversion coefficient $\gamma(i)$ (i=1, 2, ..., n) for each region i and stores a correction coefficient Lm(i) (i=1, 2, ..., n; m=1, 2, ...) for each region i, and the conversion coefficient corrector determines the conversion coefficient $\gamma s$ based on the specific conversion coefficient $\gamma(i)$ and the correction coefficients Lm (i) for the regions that correspond to the detected focal distance.

12. The automatic focusing device of claim 11 wherein the conversion coefficient corrector corrects the conversion coefficient based on $$\gamma s = \gamma(i)(1 - \Delta Bf) \over {L1(i)(1 - \Delta Bf) \over {L2(i)(1 - \Delta Bf) \over L3(i) \ldots}}$$

and the driving amount determiner determines the lens driving amount $\Delta x$ based on $$\Delta x = \Delta Bf / \gamma s.$$

13. A method for automatically focusing a lens system having a predetermined focal plane and an image forming plane, comprising the steps of:
   detecting a defocus amount $\Delta Bf$ of the image forming plane from the predetermined focal plane of the photographic lens system;
   storing a specific conversion coefficient $\gamma$ for converting the defocus amount $\Delta Bf$ into a driving amount $\Delta x$ for the focusing lens;
   storing a plurality of correction coefficients Lm (m=1, 2, ...) for correcting the specific conversion coefficient $\gamma$ according to the defocus amount $\Delta Bf$;
   calculating a conversion coefficient $\gamma s$ based on the stored specific conversion coefficient $\gamma$ and the stored correction coefficients Lm (m=1,2, ...), including the steps of
      successively correcting the correction coefficients Lm using a next correction coefficient L(m+1) and the defocus amount $\Delta Bf$, and
      correcting the specific correction coefficient $\gamma$ using the correction coefficients Lm and the defocus amount $\Delta Bf$;
   calculating the driving amount $\Delta x$ of the focusing lens from the calculated defocus amount $\Delta Bf$ using the calculated conversion coefficient $\gamma s$; and,
   controlling driving of the focusing lens based on the calculated driving amount $\Delta x$.

14. The method of claim 13, wherein the step of calculating the conversion coefficient $\gamma s$ uses a relationship represented by $$\gamma s = \gamma(1 - \Delta Bf) \over {L1(1 - \Delta Bf) \over {L2(1 - \Delta Bf) \over L3 \ldots}}$$

and the step of calculating the driving amount $\Delta x$ uses a relationship represented by $$\Delta x = \Delta Bf / \gamma s.$$

15. The method of claim 13 wherein the step of detecting the defocus amount $\Delta Bf$ includes detecting the defocus amount ΔBf in a photographic lens system with the focusing lens having a lens driving range, and further comprises the step of detecting the position of the focusing lens in the photographic lens system, wherein the step of storing a specific conversion coefficient γ includes storing a specific conversion coefficient γ(i) (i=1,2, . . . ,n) for each region i when the lens driving range of the focusing lens is divided into n regions for converting the defocus amount ΔBf to a driving amount Δx and wherein the step of storing a correction coefficient Lm includes storing a correction coefficient Lm(i) (i=1,2, . . . ,n; m=1, 2, . . . ) for each region i for correcting the conversion coefficient γ(i) in accordance with the defocus amount ΔBf, wherein for each region i the conversion coefficient has one value and the correction coefficient has a plurality of values, and wherein the step of calculating the conversion coefficient includes calculating the conversion coefficient γs based on the specific conversion coefficient γ(i) and the plurality of values of the correction coefficients Lm(i) (i=1,2, . . . ,n; m=1,2, . . . ) for the regions that correspond to the position of the focusing lens detected by the position detection means, and calculating the conversion coefficient γs by successively correcting correction coefficients Lm(i) using the next correction coefficient L(m+1)(i) and the defocus amount ΔBf, and correcting the specific conversion coefficient γ(i) using these correction coefficients and the defocus amount ΔBf.

16. The method of claim 15, wherein the step of calculating the conversion coefficient uses a relationship represented by $$\gamma s = \gamma(i)(1 - \Delta Bf) \over {L1(i)(1 - \Delta Bf) \over {L2(i)(1 - \Delta Bf) \over L3(i)\ldots}}$$

and the step of calculating a lens driving amount Δx uses a relationship represented by Δx=ΔBf/γs.

17. The method of claim 13 wherein the step of detecting the defocus amount ΔBf includes detecting the defocus amount ΔBf of a variable magnification lens system having a focal distance range, and further comprises the step of detecting the focal distance of the variable magnification lens system, wherein the step of storing a specific conversion coefficient γ includes storing a specific conversion coefficient γ(i) (i=1,2, . . . ,n) for each region i when the focal distance of the variable magnification lens system is divided into n regions for converting the defocus amount ΔBf to a driving amount Δx for the focusing lens of the variable magnification lens system, and the step of storing the plurality of correction coefficients Lm includes storing correction coefficients Lm(i) (i=1, 2, . . . ,n; m=1, 2, . . . ) for each region i for correcting the conversion coefficient γ(i) in accordance with the defocus amount ΔBf, and wherein the step of calculating the conversion coefficient γs includes calculating based on the specific conversion coefficient γ(i) and the plurality of values of the correction coefficients Lm(i) (i=1,2, . . . ,n; m=1,2, . . . ) for the regions corresponding to the focal distance detected by the focal distance detection means for each focal distance region of the variable magnification lens system, and calculating the conversion coefficient γs by successively correcting the correction coefficients Lm(i) using the next correction coefficient L(m+1)(i) and the defocus amount ΔBf, and correcting the specific conversion coefficient γ(i) using these correction coefficients and the defocus amount ΔBf.

18. The method of claim 17 wherein the step of calculating the conversion coefficient γs uses a relationship represented by $$\gamma s = \gamma(i)(1 - \Delta Bf) \over {L1(i)(1 - \Delta Bf) \over {L2(i)(1 - \Delta Bf) \over L3(i)\ldots}}$$

and the step of calculating the driving amount Δx uses a relationship represented by Δx=ΔBf/γs.

* * * * *